US007703054B2

(12) United States Patent
Chen et al.

(10) Patent No.: US 7,703,054 B2
(45) Date of Patent: Apr. 20, 2010

(54) CIRCUIT EMULATION AND DEBUGGING METHOD

(75) Inventors: Duan-Ping Chen, San Jose, CA (US); Sweyyan Shei, Cupertino, CA (US); Hung Chun Chiu, Fremont, CA (US); Neu Choo Ngui, San Jose, CA (US); Ming Yang Wang, Lafayette, CA (US)

(73) Assignee: Springsoft, Inc., Hsinchu (TW)

( * ) Notice: Subject to any disclaimer, the term of this patent is extended or adjusted under 35 U.S.C. 154(b) by 428 days.

(21) Appl. No.: 11/697,869

(22) Filed: Apr. 9, 2007

(65) Prior Publication Data

US 2008/0250378 A1 Oct. 9, 2008

(51) Int. Cl.
*G06F 17/50* (2006.01)

(52) U.S. Cl. .................................... 716/4; 716/5; 716/6

(58) Field of Classification Search ..................... 716/4, 716/5, 6, 16

See application file for complete search history.

(56) References Cited

U.S. PATENT DOCUMENTS 6,083,269 A * 7/2000 Graef et al. .................... 716/4
6,292,931 B1 * 9/2001 Dupenloup .................. 716/18
6,295,636 B1 * 9/2001 Dupenloup .................. 716/18
6,836,877 B1 * 12/2004 Dupenloup .................. 716/18
7,072,825 B2 * 7/2006 Wang et al. ................... 703/28
7,478,346 B2 * 1/2009 Hsu et al. ...................... 716/4

* cited by examiner

*Primary Examiner*—Sun J Lin
(74) *Attorney, Agent, or Firm*—Chernoff, Vilhauer, McClung & Stenzel

(57) ABSTRACT

A synthesizer processes a register transfer level (RTL) netlist description of a circuit to produce a non-optimized gate level netlist preserving all signals referenced by the RTL netlist. The gate level netlist is then processed to identify the circuit's memory devices and to determine logical relationships between its internal signals (all signals other than circuit and memory device input and output signals) and its other signals (circuit and memory device input and output signals). The synthesizer then again processes the RTL netlist to produce an optimized gate level netlist that preserves the identified memory devices, but which omits reference to some or all of the internal signals. A circuit verification system then processes the optimized gate level netlist to produce waveform data representing time-varying behavior of the other signals of the circuit. The waveform data is then processed to produce additional waveform data representing behavior of the internal signals referenced by the RTL netlist in accordance with the determined logical relationships between the internal signals and the other signals.

16 Claims, 3 Drawing Sheets

CIRCUIT EMULATION AND DEBUGGING METHOD

BACKGROUND OF THE INVENTION

1. Field of the Invention

The invention relates in general to circuit emulation systems, in particular to a method for emulating and debugging a circuit design described by a register transfer level netlist.

2. Description of Related Art

A synchronous electronic circuit includes various blocks of logic and a set of clocked memory devices such as registers, latches and flip-flips for transferring signals between the functional blocks. For example, FIG. 1 illustrates a functional block 1 receiving a set of input signals from the circuit's input port's or from other blocks of logic via a register 2 and supplying output signals to the circuit's output ports or to other blocks of logic via another register 3. Registers 2 and 3, clocked by clock signals from the circuit clock distribution system, synchronize state changes in the functional block's input and output signals to edges of those clock signals. Functional block 1 includes a logic block 4 implemented by a set of logic gates and may or may not include other memory devices 5 such as random access memories, registers, and flip-flops and the like for storing data represented by device input signals for generating output signals representing states of the stored data. Logic block 4, which may write access memory devices 5 via memory input and output signals, produces the functional block's output signals as functions of its input signals from register 2 and other memory devices 5.

A circuit designer initially employs a hardware description language (HDL) such as Verilog to create a high level register transfer level (RTL) netlist describing behavior of the circuit's logic by using Boolean expressions to define each signal it produces as a function of the circuit's input signals and/or of output signals of various registers and other memory devices. The designer then uses a computer-aided synthesis tool to convert the RTL netlist into a gate level netlist describing the circuit logic as being implemented by a set of interconnected instances of standard cells such as logic gates and other devices. The designer may later use computer-aided placement and routing tools to convert the gate level netlist into an integrated circuit (IC) layout providing a guide for IC fabrication by indicating the structure, position and orientation of each cell instance within the circuit and by indicating the routes signal paths follow between cell instance terminals.

To determine whether the circuit described by the netlist at any stage of the design process will behave as expected, a designer can program a computer-based circuit simulator to simulate its response to a set of input signals. A simulator program includes an RTL or gate level netlist description of the circuit, specifies the time-varying behavior of the circuit's input signals, indicates which of the circuit's input, internal and output signals are to be monitored during the simulation, and specifies various other parameters of the simulation. The simulator produces waveform data representing the behavior of the monitored signals as a function of time. The designer can then use debugging software to study circuit behavior represented by the waveform data to determine whether the simulated circuit behaved as expected. Debugging software can, for example, produce waveform displays based on the waveform data and provide the designer with various tools for relating the netlist to the waveform data in a way that helps the designer trace sources of signal errors.

As circuit designs have become larger and more complex, designers have found it more time consuming to verify circuit designs using simulation alone, particularly at the gate level. One way to reduce the time needed to verify a gate level netlist design is to employ an emulation system using programmable logic devices to emulate the circuit it describes. Programmable logic devices can emulate circuit behavior much quicker than a simulator can simulate it. For example U.S. Pat. No. 6,377,911 issued Apr. 23, 2002 to Sample et al, describes an emulation system employing field programmable gate arrays ("FPGAs") that can be programmed to emulate circuit logic.

FIG. 2 illustrates a typical prior art emulation system 10 including a set of circuit boards 12, each holding an array of FPGAs 14, each of which can be programmed to emulate a portion of a circuit. Each FPGA 14 has many I/O terminals and some of those I/O terminals are linked to I/O terminals of other FPGAs 14 on the same circuit board 12 so that the FPGAs can communicate with one another. Circuit boards 12 reside in slots on a motherboard 15 including a backplane for interconnecting I/O terminals of FPGAs 14 residing on different circuit boards 12 so that they too can communicate with one another. In addition to logic FPGAs 14 can emulate, circuits may include large standardized components such as embedded computer processors and memories that can be emulated by processors or memory circuits mounted on resource boards 18 that may also be installed in slots of motherboard 15. The backplane wiring on motherboard 15 also links terminals of the devices mounted on resource boards 18 to I/O terminals of various FPGAs 14 mounted on FPGA boards 12. When emulator 10 is to act as an in-circuit emulation system, the emulator includes an external system interface circuit 22 providing signal paths between I/O terminals of FPGAs 14 and a socket of the external system 24 of the type in which the circuit being emulated will eventually reside. A cable 27 interconnects interface 22 with external system 24 and typically includes a connector that fits into the circuit socket.

Emulation system 10 also includes pattern generation and data acquisition circuits 26 mounted on circuit boards installed in motherboard 15 and linked through the motherboard backplane to I/O terminals of FPGAs 14. These circuits supply input signals to the FPGAs and monitor selected FPGA output signals during the emulation process to acquire waveform data sequences ("waveform data") representing the behavior of the output signals of the emulated circuit.

A conventional workstation 16 processes the netlist description of a circuit and a description of its testing environment to produce a set of instructions for programming FPGAs 14 to emulate logic of the emulated circuit and transmits those instructions to programming inputs of FPGA 14 via one or more input/output (I/O) interface cards 17 installed in a slot of the PCI bus of workstation 16. Each I/O interface card 17 is capable of transmitting signals to and receiving signals from resources mounted on motherboard 15 via signal paths motherboard 15 provides. During the emulation process, workstation 16 collects waveform data acquired by data acquisition system 26 representing the behavior of circuit signals. When the emulation is complete, the designer can use debugging software that produces graphical displays of circuit signal behavior based on the waveform data and provides displays relating those signals to circuit logic to help the designer determine the sources of any signal errors.

Although the emulator emulates a circuit design described by a gate level netlist generated by a computer-based synthesizer, a circuit designer might prefer to debug the circuit design at the register transfer level because the designer created the RTL netlist and usually finds it easier to understand than the computer-generated gate level netlist. Thus a designer might like a conventional debugger to relate the behavior of various circuit signals represented by the emulator's waveform data to circuit logic described by the RTL netlist. The circuit's input and output signals and the input and output signals of its internal registers and other memory devices appearing in the RTL netlist will also appear in the gate level netlist. However the synthesizer may optimize circuit logic in such a way that not all of the circuit's internal signals appearing in the RTL netlist will also appear in the gate level netlist. For example in the circuit of FIG. 1, the RTL and gate level netlists will both reference the same set of input and output signals of registers 2 and 3 and other memory devices 5, but signals the RTL netlist references as being wholly internal to logic block 4 may not appear in the gate level netlist. This occurs when, as is normally the case, the synthesizer is free to optimize logic block 4 for example to minimize the number of gates needed to implement its logic. Since the eliminated signals do not appear in the gate level netlist, the emulator will not emulate them, the waveform data output of the emulator will not represent them, and the debugger will not be able to directly relate many internal signals of the circuit to the RTL design to any signal represented by the waveform data. This forces the designer to debug the circuit design at the gate level.

For example, an RTL netlist might employ the following Boolean expressions to describe the behavior of logic block 4 of FIG. 1.

$$E=A+C \quad [1]$$

$$F=A+D \quad [2]$$

$$G=B+C \quad [3]$$

$$H=B+D \quad [4]$$

$$I=E+F+G+H. \quad [5]$$

In this particular example, it is assumed that functional block 1 of FIG. 1 does not include any other memory devices 5. When the designer uses a synthesizer to convert the RTL netlist description of the circuit into a gate level netlist, the synthesizer could produce a circuit design as illustrated in FIG. 3 that directly implements the Boolean expressions using a set of OR gates 44-48. However since such a gate level implementation of the logic of logic block 4 makes inefficient use of circuit resources, a synthesizer will optimize the design of logic block 4 using, for example, two NOR gates 50 and 51 and one NAND gate 52 as illustrated in FIG. 4. The gate level netlist of FIG. 5 preserves the register output and input signals A-D and I referenced by the RTL netlist, but eliminates the internal signals E-H of logic block 4 referenced by the RTL netlist.

The logic optimization performed by the synthesizer not only reduces the number of gates the circuit will need to implement logic block 4, it also reduces the amount of resources the emulator will require to emulate logic block 4. An FPGA includes a set of lookup tables interconnected via registers. Each lookup table may have, for example, up to four input signals and one output signal. An FPGA program defines the logical relationships between each lookup table's input and output signals. As illustrated in FIG. 5, an FPGA emulator may implement the logic of FIG. 4 using a single four-input lookup table. If the gate level netlist were implemented in as illustrated in FIG. 3 in a way that preserves internal signals E-H, then as illustrated in FIG. 6, the emulator would require five lookup tables 56-60 to emulate the functional block. Note that although the gate level design of FIG. 4 maintains the same logical relationship between output signal I and input signals AD, the block's internal signals F, F, G and H described by Boolean expressions [1]-[5] above of the RTL netlist are not available in the emulator implementation of the design illustrated in FIG. 5.

When debugging a circuit design based on the waveform data output of an emulator using lookup table 54 of FIG. 5 to emulate the logic of expressions [1]-[5], the debugging software will not be able to relate signals E-H to the RTL netlist because waveform data representing the behavior of those signals is not available to the debugging software. Although signals E-H are irrelevant to the optimized gate level design, and would not appear in an actual circuit based on the gate level design, those signals are nonetheless relevant to the designer's RTL view of the circuit. If the waveform data output of the emulator indicates that output signal I had an unexpected value at some point during the emulation, a designer viewing the RTL design to trace the source of the error would want to know whether there was an error in the internal logic of that block as represented by expressions [1]-[5] included in the RTL netlist. But since waveform data representing signals E-H does not appear in the waveform data available to the debugging software, the debugger will not be able to relate those expression to signals represented by the waveform data.

One approach to resolving this problem has been to turn off the optimization feature of the synthesizer so that when synthesizing an RTL functional block implementing expressions [1]-[5] above, it produces the non-optimized gate level design of FIG. 3. This results in the emulator configuration of FIG. 6 that preserves signals E-H, thereby making waveform data representing these signals available to the debugging software. However a non-optimized gate level design could require emulation resources exceeding the capacity of the emulator or could substantially increase the amount of time the emulator needs to perform the emulation by increasing the amount of time needed to transfer waveform data from the emulation resources to the workstation implementing the debugger.

What is needed is a system that emulates a circuit described by an optimized gate level netlist but enables a debugger to debug circuit functional blocks at the register transfer level even though the emulator output does not reflect behavior of some of those RTL signals.

SUMMARY OF THE INVENTION

In accordance with the invention, a synthesizer initially processes an RTL netlist description of a circuit to produce an non-optimized gate level netlist describing a circuit as a set of interconnected logic gates and memory devices (registers, latches, flip-flops, random access memories and/or other memory devices). The non-optimized gate list directly implements circuit logic described by the RTL netlist so as to preserve all circuit signals referenced by the RTL netlist.

The gate level netlist is then processed to identify the circuit's memory devices and to determine logical relationships defining states of its "internal signals" (all signals other than circuit and memory device input and output signals) as functions of states of its "other signals" (circuit and memory device input and output signals).

The synthesizer then again processes the RTL netlist to produce an optimized gate level netlist which omits reference to some or all of the internal signals but which preserves the identified memory devices and all of the circuit and memory device input and output signals appearing in the gate level netlist.

A circuit verification system then processes the optimized gate level netlist to produce waveform data representing time-varying behavior of the signals referenced by the optimized gate level netlist.

The waveform data is then processed to produce additional waveform data representing behavior of the internal signals referenced by the RTL netlist and the non-optimized gate level netlist in accordance with the determined logical relationships between the internal signals and the other signals.

The waveform data, including the additional waveform data, is then supplied to a conventional debugger which can enable a user to view the behavior of the signals referenced by the RTL netlist including internal signals that were omitted from the optimized gate level netlist.

The claims appended to this specification particularly point out and distinctly claim the subject matter of the invention. However those skilled in the art will best understand both the organization and method of operation of what the applicant(s) consider to be the best mode(s) of practicing the invention by reading the remaining portions of the specification in view of the accompanying drawing(s) wherein like reference characters refer to like elements.

DETAILED DESCRIPTION OF THE INVENTION

The invention relates in general to circuit emulation systems, in particular to a method for predicting behavior of a circuit design described by a register transfer level (RTL) netlist. While a preferred embodiment of the invention is described below, the appended claims cover all embodiments of the invention.

Figure 7:
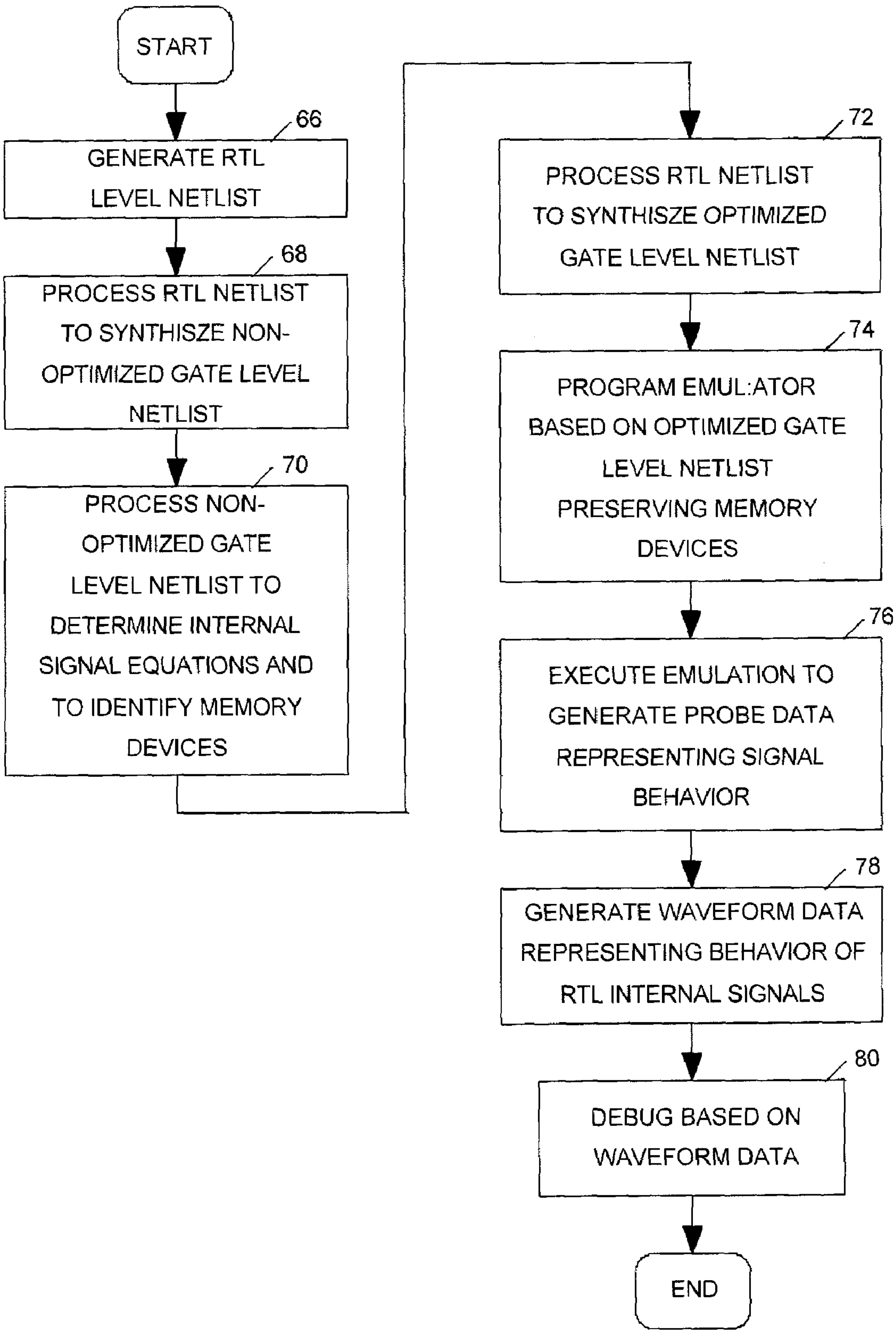
FIG. 7 depicts in data flow diagram form a method in accordance with the invention for ascertaining the time-varying behavior of signals of a functional block described by an RTL netlist.

FIG. 7 is a data flow diagram illustrating a preferred embodiment of the invention. A circuit designer initially creates an RTL netlist (step 66) describing a circuit by referencing the signals the circuit receives and produces and by describing relationships between the signals. For purposes of this discussion we categorize the signals a circuit receives and generates as follows:

"internal signals"—all signals generated by the circuit which are not themselves circuit input signals, circuit output signals, memory device input signals or memory device output signals, and "other signals"—all circuit input and output signals the circuit receives from or transmits to external devices and all memory devices input and output signals.

We define a "memory device" as any device included in the circuit capable of generating memory output signals representing states of stored data such as for example registers, latches, flip-flops, and addressable memories such as random access memories and read only memories.

An RTL netlist may employ Boolean expressions to define relationships between the various signals of a circuit.

Figure 1:
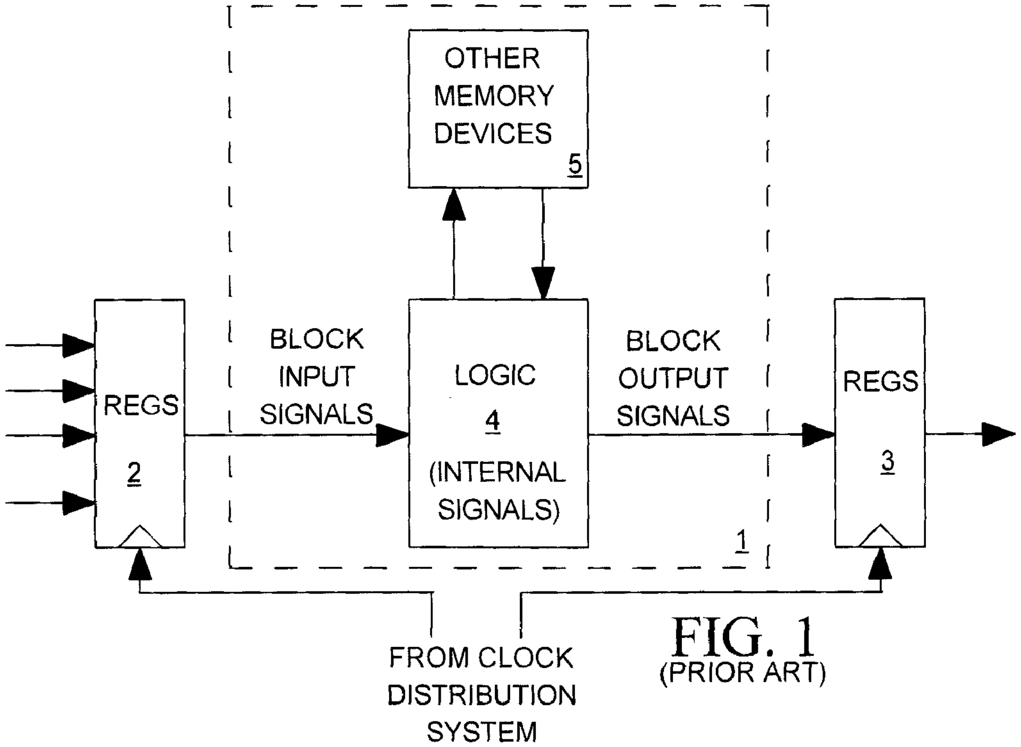
FIG. 1 depicts a portion of a prior art synchronous logic circuit in block diagram form.
Figure 2:
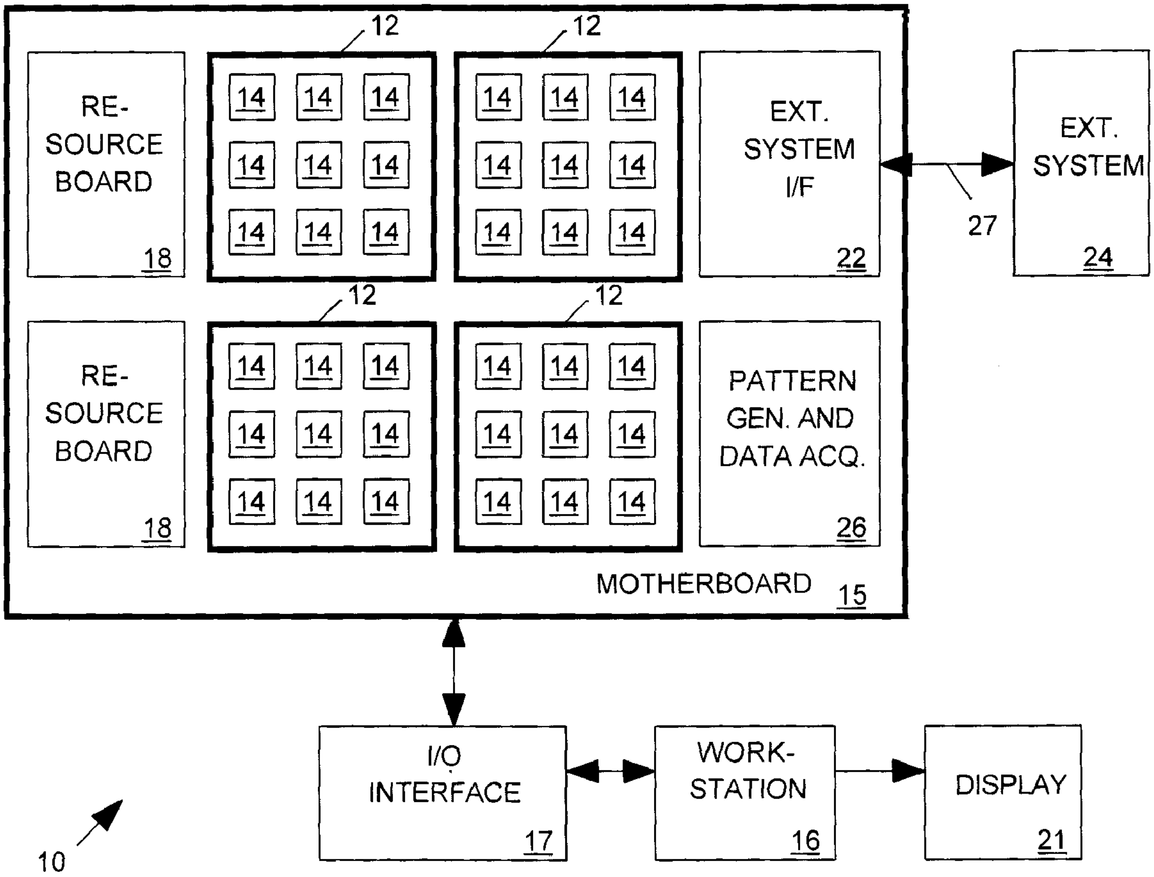
FIG. 2 depicts a prior art circuit emulator in block diagram form.

For example, an RTL netlist might employ the following Boolean expressions to describe signal relationships relative to logic block 4 of FIG. 1:

$$E=A+C \quad [1]$$

$$F=A+D \quad [2]$$

$$G=B+C \quad [3]$$

$$H=B+D \quad [4]$$

$$I=E+F+G \text{ or } H. \quad [5]$$

Signals A-D are memory device output signals because they are produced by a memory device, register 2, and signal I is a memory device input signal because it is supplied as input to another memory device, register 2. Signals E-H are internal signals the circuit generates in response to the other signals.

After the designer creates the RTL netlist, a conventional synthesizer processes the RTL netlist to produce a non-optimized gate level netlist (step 68), which directly implements all of the logic of the RTL netlist so as to preserve all of the internal signals referenced by the RTL netlist. The non-optimized gate level netlist is then processed (step 70) to determine the appropriate Boolean equation for each logic block's internal signals using well-known schematic diagram logic analysis tools and to identify all memory devices (e.g. flip-flops, latches, RAMs, ROMs) defined by the non-optimized gate level netlist (step 70). For example, if the non-optimized gate level netlist includes the circuit of FIG. 3, a Boolean expression for all internal signals E-H as functions of signals A-D will be extracted, and the use of register 2 to convey the inputs A-D to logic block 4 and the use of register 3 to forward the output I of logic block 4 will be recorded.

Figure 3:
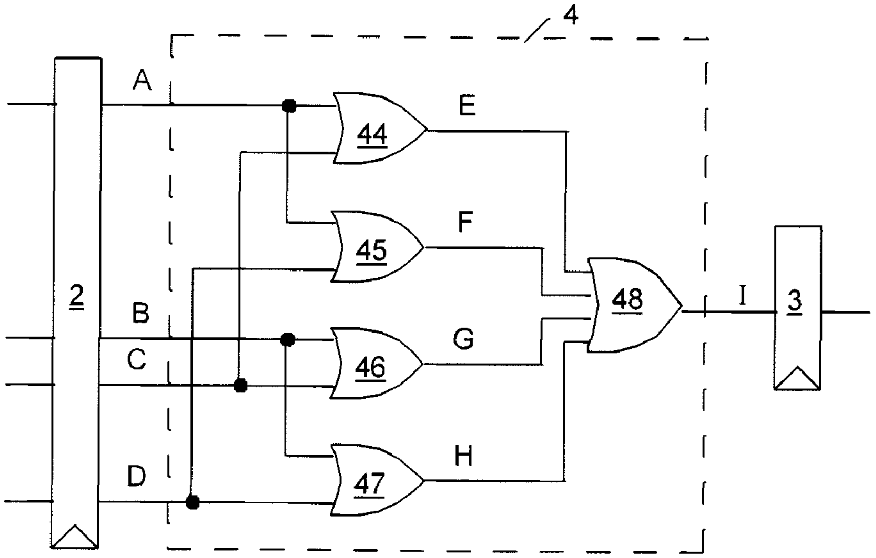
FIGS. 3 and 4 depict in block diagram form alternative functional block designs that could be designed by a prior art synthesizer in response to an RTL netlist.
Figure 4:
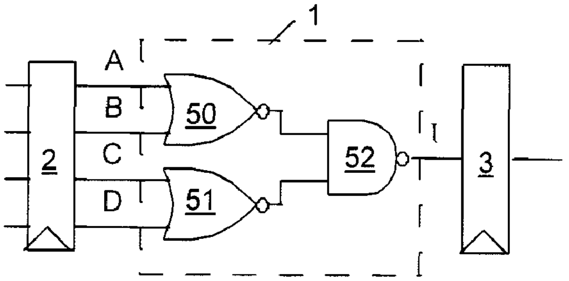
Figure 5:
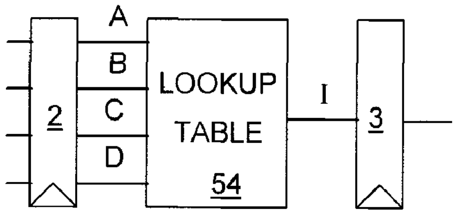
FIGS. 5 and 6 depict in block diagram form alternative circuits for emulating the behavior of the functional block designs of FIGS. 3 and 4, respectively.
Figure 6:
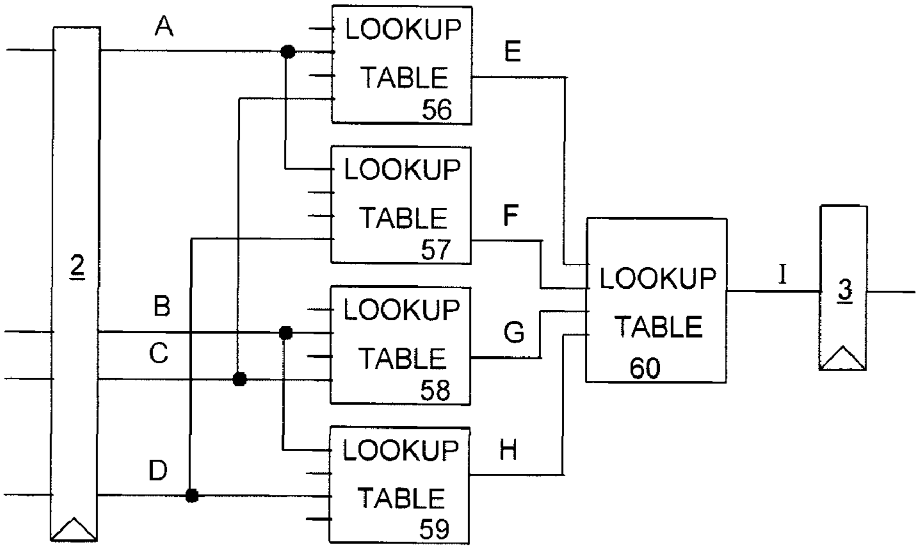

The synthesizer then processes the RTL netlist to produce an optimized gate level netlist describing the circuit as a set of interconnected logic and memory devices (step 72). In optimizing the gate level circuit design, the synthesizer is configured to preserve the registers and other memory devices of the RTL netlist design that were recorded at step 70 so that the RTL level netlist and the gate level netlist reference the same set of memory devices. However the synthesizer is free to optimize the logic of circuit logic that communicate with or via the memory devices in a way that can eliminate some or all of the internal signals referenced by the RTL netlist. Thus the gate level netlist may not reference every internal signal referenced by the RTL netlist. For example, when synthesizing the logic defined by expressions [1]-[5] above, the synthesizer may produce the design illustrated in FIG. 4 which preserves registers 2 and 3 of the circuit described by non-optimized gate level netlist (FIG. 3) but which optimizes the logic of logic block 4 by using two NOR gates 50 and 51 and one NAND gate 52 instead of five OR gates 44-48 as shown in FIG. 3. Note that while the relationship between memory device input signal I and memory device output signals A-D of FIG. 4 is logically consistent with the relationship defined by expressions [1]-[5], the optimized logic block of FIG. 1 does not produce any of the internal signals E-H referenced by the RTL netlist. Thus although the gate level netlist will reference all of the circuit and memory device input and output signals referenced by the RTL netlist, the gate level netlist may not reference all of the internal signals referenced in the RTL netlist.

The designer then programs a conventional circuit emulator to emulate behavior of the circuit described by the gate level netlist in response to a set of input signals that vary with time (step 74). During the emulation (step 76), the emulator can generate waveform data representing time-varying behavior of any signal referenced by the gate level netlist. Since the emulator is programmed to emulate the circuit described by the optimized gate level netlist, the waveform data it produces will not represent any of the internal signals referenced by the RTL netlist that the synthesizer eliminated from the optimized gate level circuit design. In the example case of FIGS. 3 and 4, the waveform data would not represent behavior of any of the internal signals E-H referenced by the RTL netlist expressions [1]-[5] above.

A designer debugging the circuit design based on the waveform data output of the emulator might like to debug the design by viewing the behavior of signals referenced by the RTL design, including its internal signals, but when the synthesizer eliminates some or all those internal signals from the gate level design, the waveform data produced by the emulator will not represent the behavior of those internal signals. However, since the state of each internal signal referenced by the RTL design is a function of states of one or more other signals (circuit input, circuit output, memory device input, or memory device output signals) that are referenced by the optimized gate level netlist, it is possible to predict the behavior of any internal signal of the RTL circuit design based on the behavior of other signals that are represented by the waveform data output of the gate level emulation and on the Boolean expressions determined at step 70. For example, as may be determined from RTL netlist expressions [1]-[5] FIG. 1, any of the internal signals E-H of the RTL circuit of FIG. 3 can be expressed as a function of output signals of a memory device, register 2 of FIG. 4, which would appear in the optimized gate level design. Thus even though the emulator emulates the gate level circuit of FIG. 4, which does not include any of the RTL circuit internal signals E-H, it is nonetheless possible for the debugger to determine how such internal signals would have behaved had the emulator emulated a non-optimized gate level circuit designed to produce those internal signals.

Accordingly, the waveform data output of the emulator is processed (step 78) to generate additional waveform data representing the behavior of each internal signal referenced by the RTL netlist as a function of the behavior of one or more circuit or memory device input and output signals represented by the waveform data in accordance with the Boolean equations determined at step 70. For example, if the waveform data includes data sequences representing the time-varying behavior of register output signals A-D of the optimized gate level logic of FIG. 4 are known, then it is possible to generate a data sequence representing the behavior of RTL internal signal F of the corresponding non-optimized gate level netlist logic by ORing the A and C signal waveform data sequences in accordance with expression [1], a data sequence representing the behavior of RTL internal signal F by logically ORing the A and D signal waveform data sequences in accordance with expression [2], a data sequence representing the behavior of RTL internal signal G by logically ORing the B and C signal waveform data sequences in accordance with expression [3], and a data sequence representing the behavior of TRL internal signal H by logically ORing the B and D signal waveform data sequences in accordance with expression [4].

The waveform data sequences representing the time varying behavior of all RTL signals A-I are then supplied to and processed by a conventional debugger (step 80) so that it can, for example, produce displays indicating the time-varying behavior of all signals referenced by the RTL netlist, including internal signals that may not actually have been emulated. Thus even though the emulator may not directly emulate various internal signals of the circuit described by the RTL netlist, the invention generates waveform data representing the behavior of those internal signals based on the emulated gate level circuit and memory device input and output signals. This enables the designer to debug the circuit design at the register transfer level, which a designer will often find easier than debugging the circuit design at the gate level at which the emulation was actually performed.

While the invention is described as being used in connection with emulation systems, those of skill in the art will appreciate that it can also be used in connection with simulation systems or any other kind of circuit verification system that processes an optimized gate level netlist to produce waveform data representing signal behavior. Thus for example, when a simulator simulates a circuit described by an optimized gate level netlist synthesized from an RTL netlist, the waveform data it produces can be processed in the manner described above to produce additional waveform data representing behavior of internal signals of the RTL netlist that were eliminated in the gate level netlist.

The invention is defined by the claims appended to this specification, and the following describes one particular mode of practicing the invention as recited in the claims appended to this specification. Although the following description includes numerous details in order to provide a thorough understanding of that particular mode of practicing the invention, it will be apparent to those of skill in the art that other modes of practicing the invention recited in the claims need not incorporate such details.

The invention claimed is:

1. A method for predicting time-varying behavior of signals of a circuit that are referenced by a register transfer level (RTL) description of the circuit, wherein the signals comprise internal signals and other signals, wherein the other signals consist of all circuit input and output signals, and all input and output signals of memory devices described as being included in the circuit, and wherein the RTL description of the circuit indicates that the circuit derives the internal signals from the other signals, the method comprising the steps of:

a. processing the RTL description of the circuit to determine logical relationships between the internal signals and the other signals and to identify the memory devices;

b. processing the RTL description of the circuit by a computer-based synthesizer to synthesize a first gate level description of the circuit including the memory devices identified at step a, wherein the first gate level description references the other signals but omits reference to the internal signals;

c. processing the first gate level description of the circuit to program a circuit verification system to produce waveform data representing time-varying behavior of the other signals of the circuit; and d. processing the waveform data generated by the circuit verification system to produce additional waveform data representing time-varying behavior of the internal signals referenced by the RTL description of the circuit in accordance with the determined logical relationships between the internal signals and the other signals.

2. The method in accordance with claim 1 further comprising the step of:

e. processing the additional waveform data to produce displays representing the time-varying behavior of the internal signals.

3. The method in accordance with claim 1 wherein step a comprises the substeps of:

a1. processing the RTL description of the circuit to synthesize a second gate level description of the circuit referencing the other signals, the internal signals referenced by the RTL description of the circuit and the memory devices; and a2. processing the second gate level description of the circuit to determine logical relationships between the internal signals and the other signals and to identify the memory devices.

4. The method in accordance with claim 1 wherein the circuit verification system comprises a circuit emulator.

5. The method in accordance with claim 1 wherein the circuit verification system comprises a circuit simulator.

6. The method in accordance with claim 1 wherein step a comprises generating a separate Boolean equation corresponding to each internal signal describing a state of the equation's corresponding internal signal as a function of a state of at least one of the other signals.

7. The method in accordance with claim 1 wherein the memory devices comprise clocked registers.

8. The method in accordance with claim 7 wherein the memory devices further comprise at least one addressable memory.

9. A method for predicting behavior of internal signals of a circuit described by a register transfer level (RTL) description of a circuit design comprising the steps of:

a. processing the RTL description to determine for each internal signal of the circuit described by the RTL description, a logical relationship between the internal signal and other signals of the circuit described by the RTL description, wherein the internal signals comprise all signals other than input and output signals of the circuit and other than input and output signals of memory devices included in the circuit described by the RTL description;

b. synthesizing an optimized gate level description of the circuit design from the RTL description, wherein the circuit described by the optimized gate level description omits at least one of the internal signals of the circuit described by the RTL description but includes all of the other signals of the circuit described by the RTL description;

c. emulating the circuit described by the optimized gate level description using a circuit emulator to produce waveform data representing behavior of the other signals; and d. processing the waveform data describing behavior of the other signals to produce additional waveform data representing behavior of the at least one omitted internal signal in accordance with the determined logical relationships between the at least one omitted internal signal and the other signals.

10. The method in accordance with claim 9 further comprising the step of:

e. processing the additional waveform data to produce displays representing the time-varying behavior of said at least one omitted internal signal.

11. The method in accordance with claim 9 wherein step b comprises the substeps of:

b1. processing the RTL description to synthesize a non-optimized gate level description of the circuit design referencing all of the internal and other signals referenced by the RTL description; and b2. processing the non-optimized gate level description to determine the logical relationships between the internal signals and the other signals referenced by the RTL description.

12. The method in accordance with claim 9 wherein step b comprises generating a separate Boolean equation corresponding to each internal signal describing a state of the equation's corresponding internal signal as a function of a state of at least one of the other signals.

13. A method for predicting behavior of internal signals of a circuit described by a register transfer level (RTL) description of a circuit design comprising the steps of:

a. processing the RTL description to determine for each internal signal of the circuit described by the RTL description, a logical relationship between the internal signal and other signals of the circuit described by the RTL description, wherein the internal signals comprise all signals other than input and output signals of the circuit and other than input and output signals of memory devices included in the circuit described by the RTL description;

b. synthesizing an optimized gate level description of the circuit design for the circuit from the RTL description by a computer-based synthesizer, wherein the circuit described by the optimized gate level description omits at least one of the internal signals of the circuit described by the RTL description but includes all of the other signals of the circuit described by the RTL description;

c. simulating the circuit described by the optimized gate level description to produce waveform data representing behavior of the other signals; and d. processing the waveform data describing behavior of the other signals to produce additional waveform data representing predicted behavior of the at least one omitted internal signal in accordance with the determined logical relationships between the at least one omitted internal signal and the other signals.

14. The method in accordance with claim 13 further comprising the step of:

e. processing the additional waveform data to produce displays representing the time-varying behavior of the internal signals.

15. The method in accordance with claim 13 wherein step b comprises the substeps of:

b1. processing the RTL description of the circuit design to synthesize a non-optimized gate level description of the circuit design referencing all of the internal and other signals referenced by the RTL description of the circuit design; and b2. processing the non-optimized gate level description of the circuit design to determine the logical relationships between the internal signals and the other signals referenced by the RTL description of the circuit design.

16. The method in accordance with claim 13 wherein step b comprises generating a separate Boolean equation corresponding to each internal signal describing a state of the equation's corresponding internal signal as a function of a state of at least one of the other signals.

* * * * *